(12) United States Patent
Kim et al.

(10) Patent No.: US 9,994,704 B2
(45) Date of Patent: Jun. 12, 2018

(54) THERMOPLASTIC ELASTOMER COMPOSITION HAVING LOW HARDNESS, AND DIAPHRAGM COMPRISING SAME

(71) Applicant: Lotte Advanced Materials Co., Ltd., Yeosu-si (KR)

(72) Inventors: Jung Wook Kim, Uiwang-si (KR); Do Hoon Chang, Uiwang-si (KR); Chang Min Hong, Uiwang-si (KR)

(73) Assignee: Lotte Advanced Materials Co., Ltd., Yeosu-si (KR)

( * ) Notice: Subject to any disclaimer, the term of this patent is extended or adjusted under 35 U.S.C. 154(b) by 0 days. days.

(21) Appl. No.: 14/364,607

(22) PCT Filed: Dec. 14, 2012

(86) PCT No.: PCT/KR2012/010942
§ 371 (c)(1),
(2) Date: Jun. 11, 2014

(87) PCT Pub. No.: WO2013/089500
PCT Pub. Date: Jun. 20, 2013

(65) Prior Publication Data
US 2014/0309353 A1  Oct. 16, 2014

(30) Foreign Application Priority Data
Dec. 15, 2011  (KR) .................. 10-2011-0135722

(51) Int. Cl.
| C08L 53/02 | (2006.01) |
| C08L 23/02 | (2006.01) |
| C08K 3/26 | (2006.01) |
| C08K 3/34 | (2006.01) |
| C08K 3/36 | (2006.01) |
| C08L 71/12 | (2006.01) |
| D06F 37/26 | (2006.01) |

(52) U.S. Cl.
CPC .............. *C08L 53/02* (2013.01); *C08L 71/12* (2013.01); *D06F 37/266* (2013.01)

(58) Field of Classification Search
CPC .......... C08L 53/02; C08L 23/02; C08K 3/26; C08K 3/34; C08K 3/36
USPC ....................................... 524/426
See application file for complete search history.

(56) References Cited

U.S. PATENT DOCUMENTS

| 3,278,435 A * | 10/1966 | Kawahara ............... 508/203 |
| 4,772,657 A | 9/1988 | Akiyama et al. |
| 6,384,123 B1 * | 5/2002 | Young ................ 524/451 |
| 7,105,611 B2 | 9/2006 | Kimura et al. |
| 7,485,682 B2 | 2/2009 | Ajbani et al. |
| 7,851,559 B2 | 12/2010 | Lee |
| 8,022,128 B2 | 9/2011 | Youn et al. |
| 8,067,495 B2 | 11/2011 | Furukawa et al. |
| 8,071,680 B2 | 12/2011 | Michihisa et al. |
| 2004/0041347 A1 | 3/2004 | Beach et al. |
| 2004/0151933 A1 | 8/2004 | Ajbani et al. |
| 2005/0288393 A1 | 12/2005 | Len et al. |
| 2007/0244237 A1 | 10/2007 | Adur |
| 2008/0058460 A1 * | 3/2008 | Tonge ............... C08L 23/04 524/494 |
| 2009/0124743 A1 * | 5/2009 | Lee .......................... 524/414 |
| 2009/0137716 A1 | 5/2009 | Furukawa et al. |
| 2009/0283973 A1 | 11/2009 | Koh et al. |
| 2010/0010141 A1 | 1/2010 | Nakamura et al. |
| 2010/0152320 A1 * | 6/2010 | Youn et al. ............ 523/122 |
| 2010/0152361 A1 | 6/2010 | Weaver et al. |
| 2012/0132110 A1 | 5/2012 | Niederer-Batorfi et al. |
| 2013/0289158 A1 * | 10/2013 | Youn et al. ............ 523/122 |

FOREIGN PATENT DOCUMENTS

| CN | 101679697 A | 3/2010 |
| CN | 101747581 A | 6/2010 |
| EP | 2123708 A1 | 11/2009 |
| EP | 1561783 B1 | 12/2009 |
| JP | 2002-338779 A | 11/2002 |
| JP | 2005-132922 A | 5/2005 |
| JP | 2006-206715 A | 8/2006 |
| JP | 2006-291019 A | 10/2006 |
| KR | 10-2010-0068214 A | 6/2010 |
| KR | 10-2011-0076494 A | 7/2011 |
| WO | 2006/080560 A1 | 8/2006 |
| WO | WO 2012/091230 * | 7/2012 |
| WO | 2013/089500 A1 | 6/2013 |

OTHER PUBLICATIONS

International Search Report in counterpart International Application No. PCT/KR2012/010942 dated Mar. 25, 2013, pp. 1-6.
Korean Office Action in commonly owned Application No. 10-2011-0049058 dated Sep. 30, 2013, pp. 1-4.
International Search Report in commonly owned International Application No. PCT/KR2011/003837 dated Feb. 27, 2012, pp. 1-4.
Extended European Search Report in commonly owned European Application No. 09178516.2-2109, dated Mar. 18, 2010.
Office Action in commonly owned U.S. Appl. No. 13/924,927 dated Apr. 2, 2015, pp. 1-12.

(Continued)

*Primary Examiner* — Deve E Valdez
(74) *Attorney, Agent, or Firm* — Additon, Higgins & Pendleton, P.A.

(57) ABSTRACT

A thermoplastic elastomer composition of the present invention comprises (A) 30 to 40% by weight of a block terpolymer of an aromatic vinyl compound and alkene or a conjugated diene-based compound; (B) 25 to 50% by weight of a paraffin oil; (C) 1 to 5% by weight of a polyolefin-based resin; (D) 5 to 20% by weight of an inorganic additive; and (E) 5 to 15% by weight of a polyphenylene ether-based resin. The thermoplastic elastomer composition, which has a surface hardness of 0.1 to 40 A (shore A), shows excellent low hardness and has improved physical properties at high temperature, particularly, flexibility, restoring force at high temperatures, and the like.

22 Claims, No Drawings

(56) References Cited

OTHER PUBLICATIONS

Non-Final Office Action in commonly owned U.S. Appl. No. 13/924,927 dated Jan. 5, 2016, pp. 1-14.
Office Action in counterpart Chinese Application No. 201280061959.5 dated Jan. 27, 2016, pp. 1-4.

* cited by examiner

THERMOPLASTIC ELASTOMER COMPOSITION HAVING LOW HARDNESS, AND DIAPHRAGM COMPRISING SAME

CROSS-REFERENCE TO RELATED APPLICATIONS

This application claims priority to and the benefit of International Application No. PCT/KR2012/010942, filed Dec. 14, 2012, which published as WO 2013/089500 on Jun. 20, 2013, and Korean Patent Application No. 10-2011-0135722, filed in the Korean Intellectual Property Office on Dec. 15, 2011, the entire disclosure of each of which is incorporated herein by reference.

FIELD OF THE INVENTION

The present invention relates to a thermoplastic elastomer composition. More specifically the present invention relates to the thermoplastic elastomer composition having excellent physical properties at room temperature and high temperatures to be usefully applied to the production of molded articles including electric and electronic parts, vehicle parts and the like.

BACKGROUND OF THE INVENTION

Thermoplastic elastomer (TPE) is a material with intermediate properties of rubber and plastic including rubber-like flexibility at room temperature similar to vulcanized rubber, and inject-moldable properties at high temperatures similar to thermoplastic materials. By said properties, the thermoplastic elastomer is applied for various purposes requiring flexibility such as sports products, food packaging, medical devices, exterior of portable IT devices, home appliances and the like. The thermoplastic elastomer is also capable of being extruded, producing products in which the vulcanized rubber is incapable of producing, reducing manufacturing time of the products, and recycling for solving environmental contamination problems of the vulcanized rubber.

However the thermoplastic elastomer has extremely poor matter properties including permanent elongation and extension rate (tension set) at high temperatures in surface hardness less than 40 A (shore A) compare to the vulcanized rubber, and has a limit on the application for products.

Specifically, as an example, the thermoplastic elastomer for a diaphragm of a washing machine combines with a tube assembly of the washing machine, seals with a door glass panel, and requires the low hardness with the surface hardness of 50A (shore A) or less for securing the vibration absorption and a buffering function of the tube assembly and sealability after closing a door. Also, physical properties including permanent elongation and extension rate and tension strength at high temperatures have to be secured at high temperatures for unique functions of the washing machine for drying and steaming laundries.

For solving said subjects, users have tried to produce a material obtained by alloying the thermoplastic elastomer with another resin but the obtained material does not fulfill the thermal properties required at high temperatures and instead, lose the surface flexibility which is an existing advantage.

In the US Patent Publication No. 2005-0288393, a thermoplastic elastomer composition comprising a thermoplastic resin, a block copolymer, a core-shell copolymer, and oil is disclosed. However the composition has the surface hardness greater than 70 A (shore A) and is unsuitable for applying to electric and electronic parts, especially a diaphragm for the washing machine.

In the US Patent Publication No. 2004-0151933, a thermoplastic elastomer composition comprising a thermoplastic resin, a rubber elastomer, a saturated elastomer, and oil is disclosed, but the thermoplastic elastomer composition is incapable of maintaining the surface hardness in the range 40 A (shore A) or less and has a limit on usability.

Accordingly, the present inventors have developed a thermoplastic elastomer composition which has excellent physical properties and is capable of being applied to the production of various molded articles including electric and electronic parts and vehicle parts and requiring flexibility by having excellent physical properties at room temperature and high temperatures. The thermoplastic elastomer composition is obtained by combining: a block terpolymer of an aromatic vinyl compound and alkene or a conjugated diene-based compound; paraffin oil; a polyolefin-based resin; an inorganic additive; and a polyphenylene ether-based resin for solving said problems.

TECHNICAL SUBJECT

The present invention provides a thermoplastic elastomer composition which maintains a range of surface hardness in 0.1-40 A (shore A) and has excellent mechanical properties and restoring force at room temperature and high temperatures.

The present invention also provides a thermoplastic elastomer composition which has excellent processing ability.

The present invention further provides a thermoplastic elastomer composition which has excellent thermal resistance, chemical resistance, and abrasion resistance.

The present invention further provides a thermoplastic elastomer composition which has excellent physical properties at room temperature and high temperatures and is capable of being applied to the production of various molded articles including electric and electronic parts and vehicle parts requiring flexibility.

The present invention further provides a thermoplastic elastomer composition which is suitable for a diaphragm of a washing machine.

The aforementioned and other objects of the present invention will be achieved by the present invention as described below.

SUMMARY OF THE INVENTION

A thermoplastic elastomer composition of the present invention comprises (A) 30 to 40% by weight of a block terpolymer of an aromatic vinyl compound with alkene or a conjugated diene-based compound; (B) 25 to 50% by weight of a paraffin oil; (C) 1 to 5% by weight of a polyolefin-based resin; (D) 5 to 20% by weight of an inorganic additive; and (E) 5 to 15% by weight of a polyphenylene ether-based resin.

The block terpolymer (A) is in A-B-A' form, wherein the A and A' blocks are hard segments and the B block is a soft segment. 20 to 35% by weight of the hard segments and 65 to 80% by weight of the soft segment are contained in the block terpolymer. In one embodiment of the present invention, the A and A' blocks are aromatic vinyl-based polymers, and the B block is an olefin or conjugated diene-based polymer.

The block terpolymer (A) may comprise a styrene-ethylene/butylene-styrene (SEBS) block copolymer, a styrene-ethylene/propylene-styrene (SEPS) block copolymer, a styrene-isoprene-styrene (SIS) block copolymer, a styrene-ethylene/(ethylene/propylene)-styrene (SEEPS) block copolymer, or a combination thereof. A weight average molecular weight of the block terpolymer (A) is preferably 140,000 to 180,000 g/mol.

The paraffin oil (B) may have a kinematic coefficient of viscosity of 95 to 215 cst (based on 40° C.).

A ratio between the block terpolymer (A) and the paraffin oil (B) to be inserted into the thermoplastic elastomer composition is 1:1 to 1:2.5.

The polyolefin-based resin (C) may have a melting index (230° C., 2.16 kg) of 20 to 40 g/10 min. The polyolefin-based resin may comprise a polyethylene resin, a polypropylene resin, a polybutylene resin, an ethylene-propylene copolymer resin, an ethylene-vinyl alcohol copolymer resin, or a combination thereof.

A particle size of the inorganic additive (D) may be 0.01 to 5 The inorganic additive (D) may comprise calcium carbonate, talc, clay, silica, mica, titanium dioxide, carbon black, graphite, wollastonite, nanosilver, or a combination thereof.

The polyphenylene ether-based resin (E) has a weight average molecular weight in a preferable range of 20,000 to 40,000 g/mol.

The thermoplastic elastomer composition may comprise 0.01 to 3 parts by weight of a silicon-based resin (F) based on 100 parts by weight of thermoplastic elastomer composition formed of (A)+(B)+(C)+(D)+(E). The silicon-based resin (F) may be a master batch composition of a silicon resin and a polyolefin-based resin, and is contained in the thermoplastic elastomer composition formed of (A)+(B)+(C)+(D)+(E), wherein the silicon resin and the polyolefin-based resin are contained in a weight ratio of 1:0.5 to 1:1.5 in the silicon-based resin (F).

The silicon-based resin (F) may comprise a silicon resin comprising polymers of of hexamethyl cyclotrisiloxane, octamethyl cyclotetrasiloxane, decamethyl cyclopentasiloxane, dodecamethyl cyclohexasiloxane, trimethyl triphenyl-cyclotrisiloxane, tetramethyl tetraphenylcyclotetrasiloxane, octaphenylcyclotetrasiloxane or a combination thereof.

The thermoplastic elastomer composition may further comprise additives comprising antimicrobial agents, thermal stabilizers, antioxidants, releasing agents, photo stabilizers, surfactants, coupling agents, plasticizers, admixtures, coloring agents, stabilizers, lubricants, antistatic agents, color mixing agents, resistants, weatherproof agents, ultraviolet absorbers, ultraviolet blocking agents, flame retardants, fillers, nucleating agents, adhesive agents, adhesives, or a combination thereof.

A molded article prepared by the thermoplastic elastomer composition has a surface hardness of 0.1 to 40 A (shore A). And the molded article has a tensile strength of 50 kgf/cm$^2$ or more measured in accordance with ASTM D638 at 23° C.; a tensile strength of 10 to 25 kgf/cm$^2$ measured in accordance with ASTM D638 at 100° C.; and a permanent elongation and extension rate of 5 to 13% at 100° C. measured in accordance with a type 3 sample of KS M 6518.

For solving other technical subjects, the proper use of the thermoplastic elastomer composition is provided. The thermoplastic elastomer composition of the present invention is capable of being preferably applied to a diaphragm of a washing machine.

EFFECT OF THE INVENTION

The present invention according can provide a thermoplastic elastomer composition that can maintain a surface hardness in a range of 0.1 to 40 A (shore A); have excellent mechanical properties, restoring force, and processing ability at room temperature and high temperatures; have excellent thermal resistance, chemical resistance, and abrasion resistance; and be suitable for electric and electronic parts and vehicle parts requiring flexibility, especially a diaphragm of a washing machine.

DETAILED DESCRIPTION OF THE INVENTION

The present invention relates to a thermoplastic elastomer composition, specifically the thermoplastic elastomer composition which is useful for producing various molded articles including electric and electronic parts and vehicle parts requiring flexibility by having excellent physical properties at room temperature and high temperatures.

The thermoplastic elastomer composition comprises (A) a block terpolymer of an aromatic vinyl compound with alkene or a conjugated diene-based compound; (B) a paraffin oil; (C) a polyolefin-based resin; (D) an inorganic additive; and (E) a polyphenylene ether-based resin. Details of each components of the present invention are described below.

(A) Block Terpolymer of an Aromatic Vinyl Compound with Alkene or a Conjugated Diene-Based Compound The block terpolymer of the present invention may be used for a surface flexibility of the thermoplastic elastomer composition. In an embodiment of the present invention, the block terpolymer (A) is in A-B-A' type, where in the A and A' blocks are hard segments and the B block is a soft segment. The hard segments are for preventing the change of thermoplasticity, and the soft segment offers properties of rubber. Various properties including hardness, thermal resistance, chemical resistance, and abrasion resistance can be provided by the type, contents, molecular weight, and arrangement of the hard and soft segments. In one embodiment of the present invention, the hard segments are 20 to 35% by weight and the soft segment is 65 to 80% by weight. In one embodiment of the present invention, the A and A' blocks are aromatic vinyl-based polymers, and preferably the hard segments are 27 to 35% by weight and the soft segment is 65 to73% by weight.

In one embodiment of the present invention, the A and A' blocks are aromatic vinyl-based polymers, and the B block is an olefin or conjugated diene-based polymer. Preferably, the A and A' blocks are a styrene-based polymer and the B block is ethylene-butylene, isoprene, ethylene-propylene, ethylene-(ethylene-propylene) polymers, and the like. More preferably the B block is an ethylene-butylene polymer.

The block terpolymer (A) can be a styrene-ethylene/butylene-styrene (SEBS) block copolymer, a styrene-ethylene/propylene-styrene (SEP S) block copolymer, a styrene-isoprene-styrene (SIS) block copolymer, a styrene-ethylene/(ethylene/propylene)-styrene (SEEPS) block copolymer, and the like, and is not necessarily selected from thereof. Said block copolymers can be used in a singular form or in a combination of more than two. Preferably the block terpolymer is a styrene-ethylene/butylene-styrene (SEBS) block copolymer.

The block terpolymer (A) preferably has a weight average molecular weight of 140,000 to 180,000 g/mol, more preferably of 147,000 to 170,000 g/mol. In the present invention, 30 to 40% by weight of the block terpolymer (A) is used for the total thermoplastic elastomer composition. Excellent surface flexibility and improved mechanical properties can be obtained by using the block terpolymer within said range.

(B) Paraffin Oil

The paraffin oil of the present invention may be used as a softening agent of the thermoplastic elastomer composition, and for improving elongation rate.

In one embodiment of the present invention, the paraffin oil has a weight average molecular weight of 400 to 1,200 g/mol, preferably 600 to 900 g/mol. The mixing during an extrusion process of the thermoplastic elastomer composition is facilitated by using the paraffin oil in said range.

In one embodiment of the present invention, the paraffin oil may have the kinematic coefficient of viscosity (kinematic viscosity) of 95 to 215 cst (based on 40° C.). Preferably the kinematic coefficient of viscosity may be in a range of 100 to 210.5 cst (based on 40° C.). In said range the paraffin oil facilitates the mixing during an extrusion process of the thermoplastic elastomer composition.

In another embodiment of the present invention, the paraffin oil has a specific gravity [15/4° C.] of 0.75 to 0.95, an ignition point of 250° C. to 330° C., and a flow point of −25° C. to −5° C. Preferably the specific gravity [15/4° C.] is 0.85 to 0.90, the ignition point is 270° C. to 300° C., and the flow point is −18° C. to −9° C.

The paraffin oil may be included in an amount of 25 to 50% by weight in the thermoplastic elastomer composition of the present invention. Excellent elongation rate, processability, and balance of matter properties may be obtained by using the paraffin oil in said range.

Preferably the amount of paraffin oil (B) in the thermoplastic elastomer composition of the present invention is same or greater than the amount of the block terpolymer (A). In this case, the thermoplastic elastomer composition can show the low hardness and high elongation rate. In an embodiment of the present invention, a rate of the block terpolymer (A) and the paraffin oil (B) may be A:B=1:1 to 1:2.5.

(C) Polyolefin-Based Resin

The polyolefin-based resin of the present invention may be used for improving processability during an extruding process and mechanical properties of the thermoplastic elastomer composition. Various properties of the thermoplastic elastomer composition can be provided by forms, molecular weight, density, melting index, and mechanical properties of the polyolefin-based resin, The polyolefin-based resin (C) may comprise a polyethylene resin, a polypropylene resin, a polybutylene resin, an ethylene-propylene copolymer resin, an ethylene-vinyl alcohol copolymer resin, or a combination thereof, preferably the polypropylene resin. The polypropylene resin is a homo-polypropylene resin. A tensile strength of the thermoplastic elastomer composition is improved when the homo-polypropylene resin is used.

In one embodiment of the present invention, the polyolefin-based resin has a melting index (230° C., 2.16 kg) of 20 to 40 g/10 min, preferably 25 to 35 g/10 min.

In one embodiment of the present invention, the polyolefin-based resin has a density of 0.85 to 1.1 g/cm$^3$. In one embodiment of the present invention, the polyolefin-based resin has the tensile strength (yield point, 50 mm/min) of 300 to 380 kg/cm$^2$. A structure of the polyolefin-based resin can be an atactic, an isotactic, or a syndiotactic.

The thermoplastic elastomer composition can comprise 1 to 5% by weight of the polyolefin-based resin, preferably 2 to 4% by weight of the polyolefin-based resin. Mechanical properties, processability, and balance of physical properties of the thermoplastic elastomer composition are improved by using the polyolefin-based resin in said range.

(D) Inorganic Additive

The inorganic additive of the present invention may be used for improving processability of the thermoplastic elastomer composition.

Both particulate and fibrous inorganic additives can be used for the thermoplastic elastomer composition, and a particulate inorganic additive is preferred. When the thermoplastic elastomer composition contains the particulate inorganic additive, a particle size of the particulate inorganic additive may be 0.01 to 5 μm.

Examples of the inorganic additive can comprise without limitation calcium carbonate, talc, clay, silica, mica, titanium dioxide, carbon black, graphite, wollastonite, nanosilver, and the like. Said materials can be used in a singular form or in a mixture of more than two. The inorganic additive is preferably calcium carbonate and talc, and more preferably calcium carbonate.

The inorganic additive can be coated with a surface processing agent such as a coupling agent, or added without a coating process. Preferably the inorganic additive is added without a coating process.

In the thermoplastic elastomer composition of the present invention, the amount of the inorganic additive is 5 to 20% by weight. Mechanical properties, processability, and balance of matter properties of the thermoplastic elastomer composition are improved when the inorganic additive is used in said range. The inorganic additive is added in a range of 10 to 17% by weight, preferably of 10.5 to 15% by weight.

(E) Polyphenylene Ether-Based Resin

By applying the polyphenylene ether-based resin, physical properties (matter properties and recovering force) of the thermoplastic elastomer composition at high temperatures may be remarkably improved.

The polyphenylene ether-based resin can be polyphenylene ether resin, or a mixture of polyphenylene ether resin with vinyl aromatic polymer.

The polyphenylene ether-based resin comprise poly(2,6-dimethyl-1,4-phenylene)ether, poly(2,6-diethyl-1,4-phenylene)ether, poly(2,6-dipropyl-1,4-phenylene)ether, poly(2-methyl-6-ethyl-1,4-phenylene)ether, poly(2-methyl-6-propyl-1,4-phenylene)ether, poly(2-ethyl-6-propyl-1,4-phenylene)ether, poly(2,6-diphenyl-1,4-phenylene)ether, poly(2,6-dimethyl-1,4-phenylene)ether, and poly(2,3,6-trimethyl-1,4-phenylene)ether; a copolymer of poly(2,6-dimethyl-1,4-phenylene)ether with poly(2,3,6-trimethyl-1,4-phenylene)ether; a copolymer of poly(2,6-dimethyl-1,4-phenylene)ether with poly(2,3,5-trimethyl-1,4-phenylene)ether, or a combination thereof. Preferably the copolymer of poly(2,6-dimethyl-1,4-phenylene)ether with poly(2,3,6-trimethyl-1,4-phenylene)ether; and poly(2,6-dimethyl-1,4-phenylene)ether, more preferably poly(2,6-dimethyl-1,4-phenylene)ether.

The degree of polymerization of the polyphenylene ether-based resin in the present invention is not specifically limited, but intrinsic viscosity measured in 25° C. chloroform solution is preferably 0.2 to 0.8 dl/g considering the thermal stability and the workability of the thermoplastic elastomer composition.

A weight average molecular weight of the polyphenylene ether-based resin may be 20,000 to 40,000 g/mol. Mechanical properties including thermal resistance and chemical resistance, and processability of the thermoplastic elastomer composition are improved when the weight average molecular weight of the polyphenylene ether-based resin is within said range.

Used molecular weight and amount of the polyphenylene ether-based resin can be determined by the molecular weight and the amount of the aromatic vinyl polymers, which are the hard segments of the block terpolymer. In the thermoplastic elastomer composition of the present invention, the polyphenylene ether-based resin is used in a range of 5 to 15% by weight. Flexibility, surface hardness, recovering force at high temperatures, and processability of the thermoplastic elastomer composition are improved when the polyphenylene ether-based resin is used in said range.

(F) Silicon-Based Resin

The silicon-based resin is used for improving abrasion resistance of the thermoplastic elastomer composition The silicon-based resin contains a silicon resin comprising polymers of hexamethyl cyclotrisiloxane, octamethyl cyclotetrasiloxane, decamethyl cyclopentasiloxane, dodecamethyl cyclohexasiloxane, trimethyl triphenylcyclotrisiloxane, tetramethyl tetraphenylcyclotetrasiloxane, octaphenylcyclotetrasiloxane or a combination thereof. The polymers can be used in a singular form or in a mixture of more than two polymers.

The silicon-based resin has a weight average molecular weight of 80,000 to 100,000 g/mol, and a specific gravity of 0.95 to 0.98.

0.01 to 3 parts by weight of silicon-based resin are added to 100 parts by weight of thermoplastic elastomer composition formed of (A)+(B)+(C)+(D)+(E), specifically 0.1 to 1.0 part by weight of silicon-based resin is added. Flexibility, surface hardness, and recovering force at high temperatures and processability and abrasion resistance of the thermoplastic elastomer composition are improved by using the silicon-based resin in said range.

Specifically, the silicon-based resin of the present invention is a master batch composition of a silicon resin and a polyolefin-based resin to be added to the thermoplastic elastomer composition. The silicon-based resin preferably contains the silicon resin and the polyolefin-based resin in a weight ratio of 1:0.5 to 1:1.5. The polyolefin-based resin for the silicon-based resin contains the contents of said polyolefin-based resin (C), and preferably the polypropylene resin is used.

The scattering of the silicon resin is prevented and strength and matter properties of the thermoplastic elastomer composition are maintained by adding the silicon-based resin to the thermoplastic elastomer composition instead of adding the silicon resin during an extrusion process of the thermoplastic elastomer composition. Abrasion resistance and coloring properties of the thermoplastic elastomer composition can be improved by securing the dispersing ability of the silicon resin.

The thermoplastic elastomer composition of the present invention is capable of containing common additives for each purpose other than said components. The additives include antimicrobial agents, thermal stabilizers, antioxidants, releasing agents, photo stabilizers, surfactants, coupling agents, plasticizers, admixtures, coloring agents, stabilizers, lubricants, antistatic agents, color mixing agents, resistants, weatherproof agents, ultraviolet absorbers, ultraviolet blocking agents, flame retardants, fillers, nucleating agents, adhesive agents, and adhesives, and said materials can be used in a singular form or in a mixture of more than two materials. The common additives are contained in a range of 30 parts by weight or less based on 100 parts by weight of thermoplastic elastomer composition. The antioxidant may be phenols, phosphides, thio-ethers, or amines A molded article of the thermoplastic elastomer composition of the present invention has a surface hardness of 40 A (shore A) or, less measured in accordance with KS M 6518, for example, the low surface hardness of 0.1 to 40 A for offering excellent flexibility, The thermoplastic elastomer composition of the present invention is capable of being produced by the following method. For instance, the components and the additives are mixed at once, melted and extruded from an extruder, and molded into pellets. In a specific example, the mixture is extruded using a biaxial extruder with L/D=20 to 60 and φ=32 to 70 mm at a cylinder temperature of 240° C., in the screw rotation speed of 300 to 600 rpm, and in the self-supplying speed of 60 to 600 kg/hr to obtain pellets.

The present invention provides the molded article obtained by molding the thermoplastic elastomer composition. The molded article is capable of being produced through inject-molding, blow-molding, extrude-molding, compress-molding and other treatment processes using the thermoplastic elastomer composition. The thermoplastic elastomer composition can be applied to various molded articles including electric and electronic parts and vehicle parts which require excellent flexibility, surface hardness, and recovering force at high temperatures, and thermal resistance, chemical resistance, processability, and abrasion resistance, and specifically to a diaphragm of a washing machine.

In an embodiment of the present invention, the properties of the molded article at room temperature (23° C.) includes has a tensile strength of 50 $kgf/cm^2$ or more measured in accordance with ASTM D638, preferably in 55 to 100 $kgf/cm^2$; a tensile strength of 10 to 25 $kgf/cm^2$ at high temperatures (100° C.); and a permanent elongation and extension rate (100° C.) of 5 to 13%.

Regarding the abrasion resistance of the molded article, the molded article of the present invention has less than 2 g of abrasion amount which is measured after repeating 12,000 times measured in accordance with ASTM D4060, preferably 1 to 1,000 mg of abrasion amount.

The present invention can be more understandable than an embodiment below, and the embodiment below is for suggesting an example of the present invention, not for limiting the breadth of the present invention limited by the interpretation of the claims.

EMBODIMENT OF THE INVENTION

EXAMPLE

The specification for each component and additive used in Example below and Comparative Example are as follows.

(A) Block Prepolymer

SEBS (Product name: G1651) with the total weight average molecular weight of 150,000 g/mol in which a hard segment is 33% by weight of styrene polymer, and a soft segment is 67% by weight of ethylene/butylene copolymer manufactured by Kraton is used.

(A') Polyolefin-Based Rubber

EPDM rubber manufactured by Dong-a Hwasung is used.

(B) Paraffin Oil

KL-900B manufactured by Seo-jin Chemicals is used.

(C) Polyolefin-Based Resin

CB5230 manufactured by Dae-han Euhwa is used.

(D) Inorganic Additive

Calcium carbonate manufactured by Kriston with a particle size of about 180 μm is used.

(E) Polyphenylene Ether-Based Resin

A polyphenylene ether resin LXR 040 C manufactured by Bluestar is used.

(F) Silicon-Based Resin

A master batch composition (Product name: MB50-001) in which a silicon resin of an octaphenyl cyclotetrasiloxane polymer and a polypropylene resin are mixed in a weight ratio of 1:1 manufactured by Dow-corning is used.

Examples 1-4 and Comparative Examples 1-4

Components (A), (B), (C), (D), and (E) are mixed in a content denoted by Table 1 (unit: % by weight), and the silicon-based resin (F) is additionally mixed to the thermoplastic elastomer composition formed by (A)+(B)+(C)+(D)+(E). The mixed thermoplastic elastomer composition is mixed in a henschel mixer at 40° C. and in the speed of 600 rpm for 40 minutes, and is molded into pellets using a biaxial extruder with L/D=36 and φ=45 mm at a cylinder temperature of 250° C. and in the screw rotation speed of 300 rpm, and using an underwater cutter. The obtained pellets are dried at 80° C. for 2 hours, and injected by a 10 oz injector at an injection temperature of 230° C. to obtain samples for measuring matter properties, and the matter properties of the pellets are measured by the following method denoted by Table 1.

Physical Properties Measurement Method (1) Hardness is measured into shore A which is a standard hardness in accordance with KS M 6518

(2) Tensile strength is measured at 23° C. and 100° C. using a type 3 sample of KS M 6518

(3) Elongation rate is measured at 23° C. and 100° C. using a type 3 sample of KS M 6518

(4) Permanent elongation and extension rate is measured at 23° C. and 100° C. using a type 3 sample of KS M 6518

TABLE 1

| | | Examples | | | | Comparative Examples | | | |
|---|---|---|---|---|---|---|---|---|---|
| | | 1 | 2 | 3 | 4 | 1 | 2 | 3 | 4 |
| (A) Block terpolymer | Wt % | 36.1 | 37.4 | 34.8 | 35.4 | — | 45 | 30 | 30 |
| (A') Polyolefin-based rubber | | — | — | — | — | 100 | — | — | — |
| (B) Paraffin oil | | 39.7 | 37.4 | 41.8 | 39.0 | — | 30 | 30 | 25 |
| (C) Polyolefin-based resin | | 2.6 | 2.8 | 2.6 | 2.6 | — | 10 | 20 | 10 |
| (D) Inorganic additive | | 10.8 | 11.2 | 10.4 | 12.4 | — | 10 | 8 | 25 |
| (E) Polyphenylene ether-based resin | | 10.8 | 11.2 | 10.4 | 10.6 | — | 5 | 12 | 10 |
| (F) Silicon-based resin | Parts by weight | 0.35 | 0.4 | 0.35 | 0.35 | — | — | — | — |
| Surface hardness (shore A) | | 35 | 40 | 32 | 37 | 45 | 48 | 67 | 52 |
| 23° C. | Tensile strength (kgf/cm$^2$) | 66 | 65 | 59 | 63 | 85.0 | 40 | 115 | 35 |
| | Elongation rate (%) | 834 | 821 | 848 | 841 | 890 | 750 | 800 | 450 |
| | Permanent elongation and extension rate | 1.5 | 2.1 | 1.4 | 2.1 | 1.3 | 4.0 | 7.0 | 6.0 |
| 100° C. | Tensile strength (kgf/cm$^2$) | 14 | 12 | 10 | 14 | 15 | 14 | 35 | 8 |
| | Elongation rate (%) | 452 | 333 | 343 | 456 | 380 | 430 | 500 | 350 |
| | Permanent elongation and extension rate | 8.6 | 7.2 | 7.3 | 9.2 | 6.9 | 12 | 15 | 20 |

As the Table above shows, Examples 1 to 4 of the present invention has the surface hardness of 0.1 to 40 A (shore A); the tensile strength of 10 to 25 kgf/cm$^2$ measured in accordance with ASTM D638.

However, in Comparative Example 1 which is an example using EPDM rubber regularly used in a diaphragm of a washing machine, the surface hardness exceeds 40 A, and in Comparative Examples 2 to 4, the surface hardness is greatly increased by the excess amount of the polyolefin-based resin.

A simple transformation or change of the present invention can be easily performed by those who have common knowledge regarding the field, and the transformation and the change is all included in the range of the present invention.

What is claimed is:

1. A thermoplastic elastomer composition comprising:
(A) 30 to 40% by weight of a block terpolymer of an aromatic vinyl compound with alkene or a conjugated diene-based compound;
(B) 25 to 50% by weight of a paraffin oil;
(C) 2 to 4% by weight of a polyolefin-based resin;
(D) 5 to 20% by weight of an inorganic additive; and
(E) 5 to 15% by weight of a polyphenylene ether-based resin,
wherein the amounts of (A), (B), (C), (D), and (E) are based on 100% by weight of the thermoplastic elastomer composition formed of (A)+(B)+(C)+(D)+(E), and
(F) 0.01 to 0.4 parts by weight of silicone-based resin based on 100 parts by weight of the thermoplastic elastomer composition formed of (A)+(B)+(C)+(D)+(E), wherein the silicone-based resin (F) is a master batch composition of a silicone resin and the polyolefin-based resin,
wherein the silicone-based resin (F) includes a silicone resin comprising a polymer of hexamethyl cyclotrisiloxane, octamethyl cyclotetrasiloxane, decamethyl cyclopentasiloxane, dodecamethyl cyclohexasiloxane, trimethyl triphenylcyclotrisiloxane, and/or tetramethyl tetraphenylcyclotetrasiloxane, and wherein the thermoplastic elastomer composition has a permanent elongation set (%) of 1.4 to 2.1 measured at 23° C. in accordance with KS M 6518.

2. The thermoplastic elastomer composition according to claim 1, wherein the silicone-based resin includes the silicone resin and the polyolefin-based resin in a weight ratio of 1:0.5 to 1:1.5.

3. The thermoplastic elastomer composition according to claim 1, wherein the block terpolymer is in an A-B-A' form, the A and A' blocks are hard segments, the B block is a soft segment, and the block terpolymer includes 20 to 35% by weight of the A and A' blocks and 65 to 80% by weight of the B block.

4. The thermoplastic elastomer composition according to claim 3, wherein the A and A' blocks are aromatic vinyl polymers, and the B block is an olefin or conjugated diene-based polymer.

5. The thermoplastic elastomer composition according to claim 1, wherein the block terpolymer (A) comprises a styrene-ethylene/butylene-styrene (SEBS) block copolymer, a styrene-ethylene/propylene-styrene (SEPS) block copolymer, a styrene-isoprene-styrene (SIS) block copolymer, a styrene-ethylene/(ethylene/propylene)-styrene (SEEPS) block copolymer, or a combination thereof.

6. The thermoplastic elastomer composition according to claim 1, wherein the block terpolymer (A) has a weight average molecular weight of 140,000 to 180,000 g/mol.

7. The thermoplastic elastomer composition according to claim 1, wherein the paraffin oil has a kinematic coefficient of viscosity of 95 to 215 cst (based on 40° C.).

8. The thermoplastic elastomer composition according to claim 1, comprising the block terpolymer (A) and the paraffin oil (B) in a ratio of 1:1 to 1:2.5.

9. The thermoplastic elastomer composition according to claim 1, wherein the polyolefin-based resin (C) has a melting index (230° C., 2.16 kg) of 20 to 40 g/10 min.

10. The thermoplastic elastomer composition according to claim 1, wherein the polyolefin-based resin (C) comprises a polyethylene resin, a polypropylene resin, a polybutylene resin, an ethylene-propylene copolymer resin, an ethylene-vinyl alcohol copolymer resin, or a combination thereof.

11. The thermoplastic elastomer composition according to claim 1, wherein the inorganic additive (D) has a particle size of 0.01 to5 μm.

12. The thermoplastic elastomer composition according to claim 1, wherein the inorganic additive (D) comprises calcium carbonate, talc, clay, silica, mica, titanium dioxide, carbon black, graphite, wollastonite, nanosilver, or a combination thereof.

13. The thermoplastic elastomer composition according to claim 1, wherein the polyphenylene ether-based resin (E) has a weight average molecular weight of 20,000 to 40,000 g/mol.

14. The thermoplastic elastomer composition according to claim 1, wherein the thermoplastic elastomer composition further comprises additives selected from antimicrobial agents, thermal stabilizers, antioxidant, releasing agents, photo stabilizers, surfactants, coupling agents, plasticizers, admixtures, coloring agents, stabilizers, lubricants, antistatic agents, color mixing agents, resistants, weatherproof agents, ultraviolet absorbers, ultraviolet blocking agents, flame retardants, fillers, nucleating agents, adhesive agents, adhesives, and combinations thereof.

15. A molded article prepared by the thermoplastic elastomer composition of claim 1, wherein the molded article has a surface hardness of 0.1 to 40 A (shore A).

16. The molded article according to claim 15, wherein the molded article has a tensile strength of 50 kgf/cm$^2$ or more measured in accordance with ASTM D638 at 23° C.; a tensile strength of 10 to 25 kgf/cm$^2$ measured in accordance with ASTM D638 at 100° C.; and a permanent elongation and extension rate of 5 to 13% at 100° C. measured in accordance with a type 3 sample of KS M 6518.

17. The molded article according to claim 15, wherein the molded article is a diaphragm of a washing machine.

18. The thermoplastic elastomer composition according to claim 1, wherein a molded article prepared by the thermoplastic elastomer composition of claim 1 has a surface hardness of 0.1 to 40 A (shore A) measured in accordance with KSM 6518.

19. The thermoplastic elastomer composition according to claim 18, wherein a molded article prepared by the thermoplastic elastomer composition of claim 1 has less than 2 g abrasion amount after repeating 12,000 times measured in accordance with ASTM D4060.

20. The thermoplastic elastomer composition according to claim 19, wherein a molded article prepared by the thermoplastic elastomer composition of claim 1 has 1 mg to 1000 mg abrasion amount after repeating 12,000 times measured in accordance with ASTM D4060.

21. The thermoplastic elastomer composition according to claim 1, comprising 0.01 to 0.35 parts by weight of the silicon-based resin (F), wherein a molded article prepared by the thermoplastic elastomer composition of claim 1 has a surface hardness of 0.1 to 37 A (shore A) measured in accordance with KSM 6518.

22. The thermoplastic elastomer composition according to claim 1, wherein the silicone-based resin (F) includes a silicone resin comprising a polymer of hexamethyl cyclotrisiloxane, octamethyl cyclotetrasiloxane, decamethyl cyclopentasiloxane, and/or dodecamethyl cyclohexasiloxane.

* * * * *

UNITED STATES PATENT AND TRADEMARK OFFICE
CERTIFICATE OF CORRECTION

| | |
|---|---|
| PATENT NO. | : 9,994,704 B2 |
| APPLICATION NO. | : 14/364607 |
| DATED | : June 12, 2018 |
| INVENTOR(S) | : Jung Wook Kim et al. |

It is certified that error appears in the above-identified patent and that said Letters Patent is hereby corrected as shown below:

In the Specification

Column 3, delete Line 19 and insert: --to 5 µm. The inorganic additive (D) may comprise calcium--

Column 8, delete Line 50 and insert: --(A) Block terpolymer--

Signed and Sealed this
Thirtieth Day of October, 2018

Andrei Iancu
*Director of the United States Patent and Trademark Office*